United States Patent
Nissan-Messing et al.

(10) Patent No.: US 7,409,595 B2
(45) Date of Patent: Aug. 5, 2008

(54) HISTORY-BASED PRIORITIZING OF SUSPECTED COMPONENTS

(75) Inventors: Orit Nissan-Messing, Hod HaSharon (IL); Aviad Zlotnick, Galil Tachton (IL)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 11/037,513

(22) Filed: Jan. 18, 2005

(65) Prior Publication Data

US 2006/0161819 A1 Jul. 20, 2006

(51) Int. Cl.
*G06F 11/00* (2006.01)

(52) U.S. Cl. .......................................... 714/26; 714/48

(58) Field of Classification Search .................. None
See application file for complete search history.

(56) References Cited

U.S. PATENT DOCUMENTS

| | | | | |
|---|---|---|---|---|
| 4,633,467 | A * | 12/1986 | Abel et al. ..................... | 714/45 |
| 5,214,653 | A * | 5/1993 | Elliott et al. ................... | 714/26 |
| 5,253,184 | A * | 10/1993 | Kleinschnitz ............... | 702/184 |
| 5,293,556 | A * | 3/1994 | Hill et al. .................... | 702/184 |
| 5,561,760 | A * | 10/1996 | Ferris et al. ................... | 714/25 |
| 6,415,395 | B1 * | 7/2002 | Varma et al. .................. | 714/37 |
| 6,487,677 | B1 * | 11/2002 | Jantz et al. ..................... | 714/2 |
| 6,574,537 | B2 * | 6/2003 | Kipersztok et al. ........... | 701/29 |
| 6,622,264 | B1 * | 9/2003 | Bliley et al. .................. | 714/26 |
| 6,625,745 | B1 | 9/2003 | Johnson et al. | |
| 6,633,782 | B1 * | 10/2003 | Schleiss et al. ............... | 700/26 |
| 6,895,533 | B2 * | 5/2005 | Gray et al. .................... | 714/47 |
| 7,050,941 | B2 * | 5/2006 | Wada .......................... | 702/185 |
| 7,143,316 | B2 * | 11/2006 | Christodoulou et al. ....... | 714/43 |
| 7,206,771 | B2 * | 4/2007 | Alvarez et al. ................ | 706/45 |
| 2002/0019870 | A1 * | 2/2002 | Chirashnya et al. ......... | 709/224 |
| 2003/0216881 | A1 | 11/2003 | Weis et al. | |
| 2004/0059966 | A1 * | 3/2004 | Chan et al. .................... | 714/48 |
| 2005/0091356 | A1 * | 4/2005 | Izzo ........................... | 709/223 |

FOREIGN PATENT DOCUMENTS

WO WO 03/105039 12/2003

OTHER PUBLICATIONS

Coit et al., "Prioritizing System-Reliability Prediction Improvements", 2001, IEEE.*

* cited by examiner

*Primary Examiner*—Gabriel L Chu

(57) ABSTRACT

A method for servicing a computerized system includes detecting a failure of a given type in the computerized system, and generating a list of corrective actions in response to the failure, using an automated maintenance program. A record of one or more previous failures of the given type in the computerized system is retrieved, indicating at least one previous corrective action taken in response to the previous failures. The method prioritizes the list of corrective actions responsively to the record, using the automated maintenance program, so as to adjust a priority of the at least one previous corrective action in the list. The prioritized list from the automated maintenance program is provided to a repair function for use in servicing the computerized system.

12 Claims, 2 Drawing Sheets

HISTORY-BASED PRIORITIZING OF SUSPECTED COMPONENTS

FIELD OF THE INVENTION

The present invention relates generally to computer systems and specifically to methods and systems for fault diagnosis and maintenance in computer systems.

BACKGROUND OF THE INVENTION

The development of complex systems containing multiple subsystems and components presents significant reliability and maintainability challenges. As a consequence, various methods and systems have been proposed for detecting, diagnosing and correcting faults in such systems. Applications for automated self-diagnostic systems range from the computer industry, through industrial machinery, to aerospace applications.

For example, U.S. Pat. No. 6,003,081, whose disclosure is incorporated herein by reference, describes a method for automatically generating a repair request from a remote client to a server, wherein the client identifies the malfunctioning part and transmits an error notification and an identification of the faulty part to the server. Similarly, U.S. Pat. No. 5,774,645, whose disclosure is incorporated herein by reference, describes a device for identifying faults in a complex system containing a plurality of elements. The device has a centralized processing station monitoring a system of complex elements, which issue fault cues to the central processing station.

Some fault monitoring systems utilize historical information from previous fault events. For example, U.S. Pat. No. 6,415,395, whose disclosure is incorporated herein by reference, describes a system and method for processing repair data and fault log data from one or more machines to facilitate analysis of a malfunctioning machine, particularly applied to the locomotive industry. Similarly, U.S. Pat. No. 6,622,264, whose disclosure is incorporated herein by reference, describes a process, relating to the locomotive industry, for analyzing fault log data from a machine, and generating repair recommendations based upon the comparison of the new fault log data and prior fault log data.

Relating to computer systems, U.S. Pat. No. 4,654,852, whose disclosure is incorporated herein by reference, describes a data-processing system that diagnoses problems in one of its subsystems and displays information directing an operator to perform certain actions. The information is based upon the subsystem configuration, previous test results, and operator inputs. U.S. Pat. No. 4,922,491, whose disclosure is incorporated herein by reference, describes a method of automatically detecting and analyzing exception events in a computer peripheral subsystem. A database is searched to determine whether the current exception event relates to a problem already recorded. If a match is found, a service alert message is transmitted to the host system, containing a variety of information for the subsystem user and for a repair technician.

SUMMARY OF THE INVENTION

The cost of servicing computerized systems is a major contributor to the overall operating cost of the system. This is particularly true for large and complex computer systems, comprising many sub-units and components. It is desirable to reduce the cost involved in detecting, diagnosing and correcting faults in such computerized systems. Cost reduction may be achieved by automatic maintenance systems. The use of automatic maintenance helps to reduce maintenance costs in several ways:

The time required to detect faulty components is reduced.

It is possible to delegate a larger portion of maintenance functions to local staff, such as a local system manager, thereby reducing the cost of external maintenance and support services.

An automatic system may easily rely on historical data for making decisions, thereby increasing the probability of success.

Embodiments of the present invention address situations in which an automatic maintenance system is not able to isolate the fault and identify a single failed component. Instead, the system generates a list of several components suspected of causing the fault. To a technician, this list is typically presented as a list of suggested corrective actions for correcting the fault. Disclosed embodiments provide methods for improving the probability of successful fault correction, by prioritizing the list of corrective actions based on historical data regarding past repairs. Typically, corrective actions that have already been performed in the recent past are moved to the end of the list, so that the technician is prompted to try different actions when a failure recurs.

There is therefore provided, in accordance with an embodiment of the present invention, a method for servicing a computerized system, including:

detecting a failure of a given type in the computerized system;

generating a list of corrective actions in response to the failure, using an automated maintenance program;

retrieving a record of one or more previous failures of the given type in the computerized system, and indicating at least one previous corrective action taken in response to the previous failures;

prioritizing the list of corrective actions responsively to the record, using the automated maintenance program, so as to adjust a priority of the at least one previous corrective action in the list; and providing the prioritized list from the automated maintenance program to a repair function for use in servicing the computerized system.

In one embodiment, the computerized system includes a data storage system.

In another embodiment, detecting the failure includes receiving an automatic failure alert.

In yet another embodiment, retrieving the record includes determining a time of the at least one previous corrective action, and prioritizing the list includes ordering the list responsively to the time.

In another disclosed embodiment, ordering the list includes determining a most-recently-performed action, and moving the most-recently-performed action to the end of the list.

Alternatively, ordering the list includes reordering the list in ascending order of the time. Further alternatively, ordering the list includes determining the priority responsively to the time of the at least one previous corrective action and to a measure of probability of the previous failures.

In still another embodiment, determining the priority includes comparing the time of the at least one previous corrective action performed on a component of the computerized system to a mean time between failures (MTBF) of the component.

In another embodiment, ordering the list includes determining whether to change the priority by comparing the time of the at least one previous corrective action performed on a component of the computerized system to a characteristic failure time of the component.

In yet another embodiment, generating the list of corrective actions includes listing one or more suspected components to be replaced by the repair function. Additionally or alternatively, the method includes automatically detecting the components replaced by the repair function so as to generate the record.

In another embodiment, providing the prioritized list includes presenting the prioritized list to a repair person.

There is also provided, in accordance with an embodiment of the present invention, apparatus for use in servicing a computerized system, the apparatus including a maintenance processor, which is arranged to receive an indication of a failure of a given type in the computerized system, to generate a list of corrective actions in response to the failure, to retrieve a record of one or more previous failures of the given type in the computerized system, and indicating at least one previous corrective action taken in response to the previous failures, to prioritize the list of corrective actions responsively to the record so as to adjust a priority of the at least one previous corrective action in the list, and to provide the prioritized list to a repair function for use in servicing the computerized system.

There is additionally provided, in accordance with an embodiment of the present invention, a computer software product for use in servicing a computerized system, the product including a computer-readable medium in which program instructions are stored, which instructions, when read by a computer, cause the computer to receive an indication of a failure of a given type in the computerized system, to generate a list of corrective actions in response to the failure, to retrieve a record of one or more previous failures of the given type in the computerized system, and indicating at least one previous corrective action taken in response to the previous failures, to prioritize the list of corrective actions responsively to the record so as to adjust a priority of the at least one previous corrective action in the list, and to provide the prioritized list to a repair function for use in servicing the computerized system.

The present invention will be more fully understood from the following detailed description of the embodiments thereof, taken together with the drawings in which:

DETAILED DESCRIPTION OF EMBODIMENTS

Figure 1:
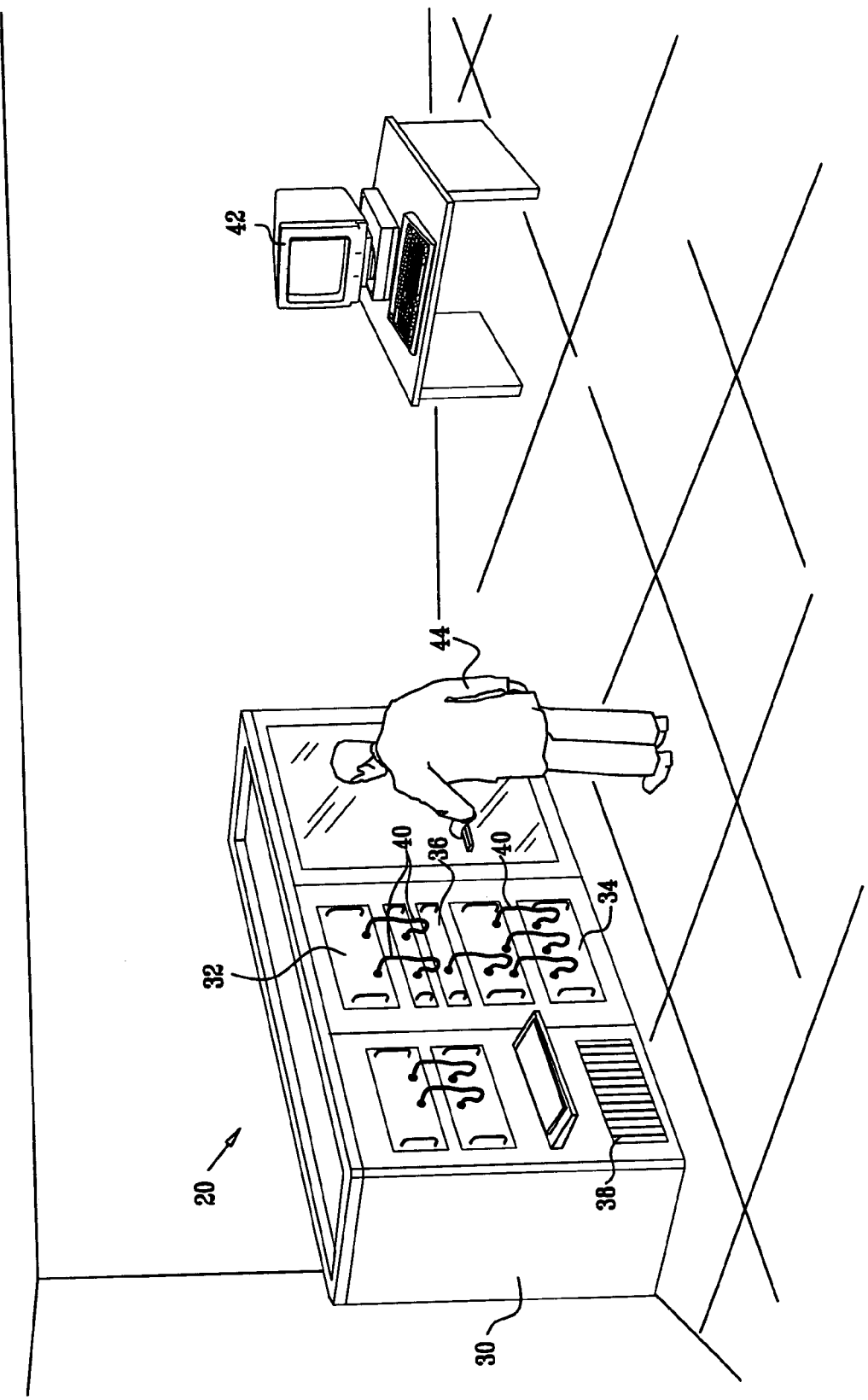
FIG. 1 is a schematic, pictorial illustration of a computerized system, in accordance with an embodiment of the present invention.

FIG. 1 is a schematic, pictorial illustration of a computerized system 20, in accordance with an embodiment of the present invention. System 20 comprises a mainframe 30, which comprises various hardware units such as computer platforms 32, storage units 34, communications units 36 and other miscellaneous hardware components. Cables 40 interconnect the various hardware units. A maintenance processor 38 performs maintenance-related tasks, as will be described in detail hereinbelow. Additional peripheral computing equipment, such as an operator console 42, may also be part of the computerized system. In different embodiments of the present invention, the computerized system may be assigned to perform any computing task, such as data storage, data processing or any other computing task as is known in the art.

A technician 44 is responsible for first-level maintenance of the computerized system. The technician may replace, in response to a failure, one or more hardware units in mainframe 30. The technician may use operator console 42 to access system information, receive failure alarms and reports, and perform other service, repair and maintenance tasks. Alternatively or additionally, some or all of the service and repair functions in system 20 may be performed automatically, by a robot, for example. Maintenance processor 38 monitors the operation of the computerized system and detects and records failures automatically. In addition, maintenance processor 38 records the identity of all hardware units of mainframe 30, and detects automatically whenever a technician replaces a hardware unit.

Once the maintenance processor has detected a failure, it attempts to localize it and identify the faulty component or components. A successful identification directs the technician to the cause of the failure, thereby reducing the service time. In many scenarios, however, the maintenance processor cannot isolate a single faulty component in response to a failure, due to the complexity of the computerized system. For example, in a large data storage system, a failure characterized by a pattern of intermittent read or write failures across several logical storage volumes may be due to any number of reasons, such as a faulty physical storage unit, a faulty cable or a faulty control module in another unit.

In this sort of situation, the maintenance processor typically generates a short list of possible causes of the failure and corrective actions (such as replacement of one or more components) that may be taken to remedy them. The list may be generated, for example, using expert system software, which typically prioritizes the list according to certain criteria, such as the likelihood that each of the corrective actions will remedy the failure. This list is presented to technician 44, who then chooses the appropriate corrective action from the list. For example, the technician may perform any of the following:

Replace only the first item on the list.

Replace only items available in stock, while ordering others.

Replace only low-cost items.

Replace the entire list of components, if the failure is severe and the parts are inexpensive and readily available.

Maintenance processor 38 records the fact that certain hardware components have been replaced by the technician, for example by detecting that new serial numbers have appeared on the system bus.

Most often, the technician will naturally replace the first item on the list, or one of the first few items. Embodiments of the present invention provide a method for improving the probability of success of correcting a fault, by reordering and prioritizing the list of corrective actions given by maintenance processor 38 to technician 44 so as to avoid repeating actions that were performed recently without evident success.

Typically, maintenance processor 38 comprises a general-purpose computer, which is programmed in software to carry out the functions described herein. The software may be downloaded to the computer in electronic form, over a network, for example, or it may alternatively be supplied to the computer on tangible media, such as CD-ROM. Maintenance processor 38 may comprise a standalone unit, or it may alternatively be integrated with other computing equipment, or its functions shared with other functions of computerized system 20 on a single computer platform, as is known in the art. Although maintenance processor 38 is described herein, for the sake of clarity, as a separate entity, the functions of maintenance processor 38 may alternatively be performed by one or more of the computer platforms in mainframe 30, among other tasks carried out by these platform in question.

Figure 2:
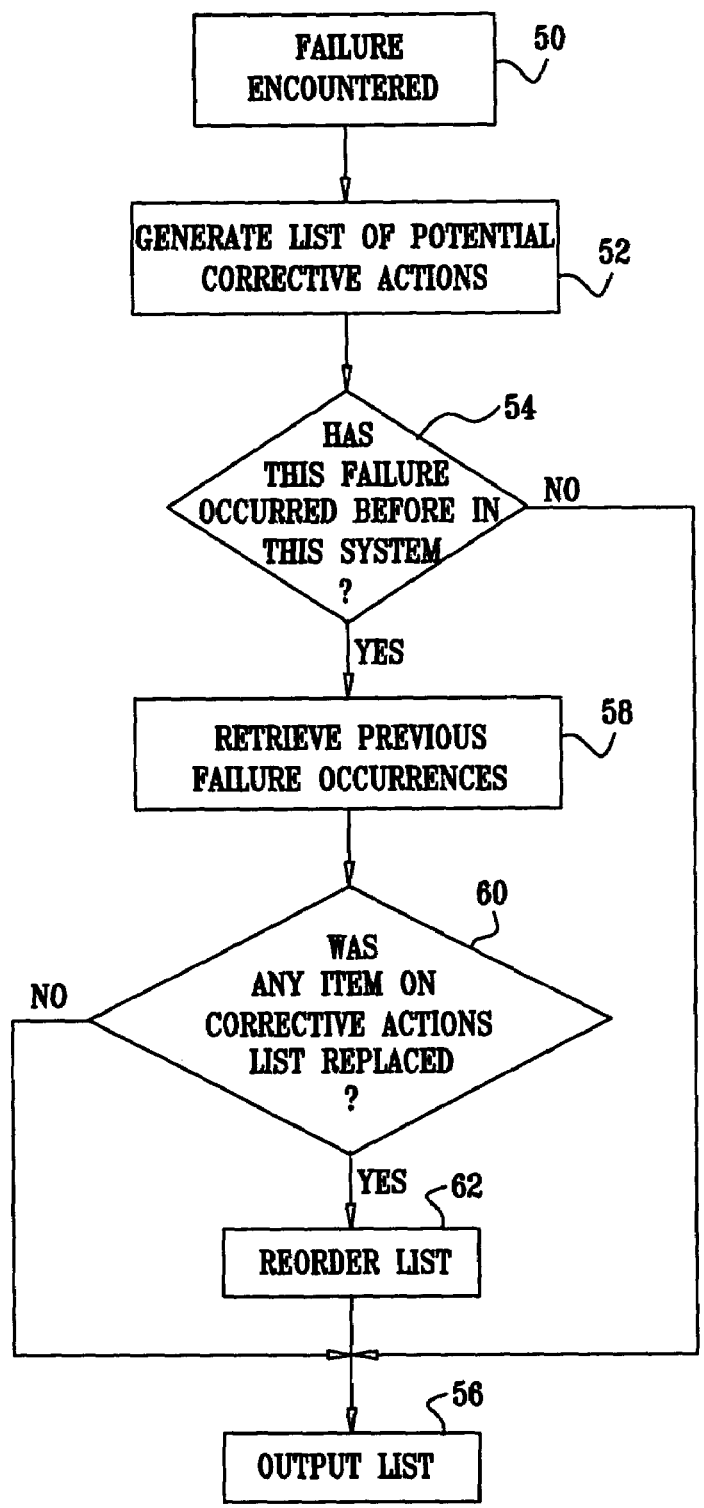
FIG. 2 is a flow chart that schematically illustrates a method for diagnosing and servicing a computerized system, in accordance with an embodiment of the present invention.

FIG. 2 is a flow chart that schematically illustrates a method for diagnosing and servicing a computerized system, in accordance with an embodiment of the present invention. This method is described, for clarity and convenience, with reference to computerized system 20, as described above. The principles of the present invention, however, may similarly be applied to computer-assisted diagnosis and repair of many other types of complex systems, as will be apparent to those skilled in the art.

The method of FIG. 2 begins when maintenance processor 38 detects a failure in computerized system 20 at a failure detecting step 50. The maintenance processor attempts to isolate the fault to specific components, and generates a list of possible corrective actions at a list generating step 52. Typically, each corrective action involves replacement of one or more components in system 20, although other sorts of corrective actions may also be included in the list. The maintenance processor checks whether or not there are recent records of similar failure events having occurred in this specific computerized system 20, at a history checking step 54. If no such previous records exist, the maintenance processor outputs a predetermined list of corrective actions and terminates at a termination step 56. Typically, in this case the list is ranked according to predetermined criteria, such as statistical analysis of past faults in order to rank the corrective actions in terms of their a priori likelihood of success, ease of execution, and/or cost of replacement components. Methods of automated failure diagnosis known in the art, such as those described in the Background of the Invention, may be used at this step.

If, on the other hand, maintenance processor 38 finds a previous record of one or more similar recent failures in computerized system 20, it retrieves the lists of corrective actions that were generated in response to the previous failures at a list retrieving step 58. The maintenance processor then checks which corrective action or actions were taken (typically, which previously-suspected components were indeed replaced) in response to the previous failures, at a replacement checking step 60. At the same time the maintenance processor notes the date and time at which each past replacement occurred.

Based on the knowledge of previous replacements, the maintenance processor reorders the present list of corrective actions at a list reordering step 62. In one embodiment, the maintenance processor moves the most-recently performed action on the present list to the end of the list, thereby assigning it a low priority. The next-most-recently performed action may be placed second-to-last. A maintenance action is considered "recent" in this context if the time that has passed since the action is less than or on the order of a characteristic failure time (such as the mean time between failures—MTBF) of the component in question. Actions performed much longer ago than this characteristic time are typically ignored. The maintenance processor outputs the reordered list of corrective actions and terminates at termination step 56.

In another embodiment, the maintenance processor reorders the present list completely at step 62, in descending order of priority, based on the time that passed from the previous performance of each action. In other words, the most-recently performed action is moved to the end of the list, the second-most-recently performed action becomes one before last, and so on. The action at the beginning of the reordered list is assumed to be the most likely candidate for execution. In this way, the maintenance processor prompts the technician to avoid repeating corrective actions that were taken in the recent past and were apparently unsuccessful, as evidenced by the recurrence of the failure.

In yet another embodiment, the list may be reordered at step 62 by considering a measure of the a priori probability of component faults, such as the MTBF of the components in question. For example, consider a failure that may be caused either by a disk fault or a switch fault. Assume, for the sake of the example, that a switch is far more reliable than a disk. Therefore, the failure has a 99% probability of being caused by a disk fault, and only 1% probability of being caused by a switch fault. In this case, the decision as to reordering of the list of corrective actions is based on both the times at which components were replaced and on the conditional probability (based on the MTBF, for example) of a repeat failure. As a result, the corrective action of replacing a disk may receive a higher priority than replacing a switch, even if a disk was already replaced a short while ago.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for servicing a computerized system, comprising:
   detecting a failure of a given type in the computerized system;
   generating a list of corrective actions in response to the failure, using an automated maintenance program;
   retrieving a record of one or more previous failures of the given type in the computerized system, and indicating previous corrective actions and times at which the previous corrective actions were taken in response to the previous failures, including at least a first corrective action taken at a first time and a second corrective action taken at a second time, more recent than the first time;
   prioritizing the list of corrective actions responsively to the times at which the previous corrective actions were taken, using the automated maintenance program, so as to reduce a priority of the second corrective action, which was taken at the more recent time, relative to the first corrective action; and
   providing the prioritized list from the automated maintenance program to a repair function for use in servicing the computerized system.

2. The method according to claim 1, wherein the computerized system comprises a data storage system.

3. The method according to claim 1, wherein detecting the failure comprises receiving an automatic failure alert.

4. The method according to claim 1, wherein wherein prioritizing the list comprises ordering the list responsively to the times at which the previous corrective actions were taken.

5. The method according to claim 4, wherein ordering the list comprises determining a most-recently-performed action, and moving the most-recently-performed action to the end of the list.

6. The method according to claim 4, wherein ordering the list comprises reordering the list in ascending order of the times at which the previous corrective actions were taken.

7. The method according to claim 4, wherein ordering the list comprises determining the priority of the second corrective action responsively to a measure of probability of the previous failures.

8. The method according to claim 7, wherein the second corrective action was performed on a component of the computerized system, and wherein determining the priority of the second corrective action comprises comparing the second time to a mean time between failures (MTBF) of the component.

9. The method according to claim 4, wherein the second corrective action was performed on a component of the computerized system, and wherein ordering the list comprises determining whether to reduce the priority of the second corrective action by comparing the second time to a characteristic failure time of the component.

10. The method according to claim 1, wherein generating the list of corrective actions comprises listing one or more suspected components to be replaced by the repair function.

11. The method according to claim 10, and comprising automatically detecting the components replaced by the repair function so as to generate the record.

12. The method according to claim 1, wherein providing the prioritized list comprises presenting the prioritized list to a repair person.

* * * * *